(12) United States Patent
Bang (10) Patent No.: US 6,191,937 B1
(45) Date of Patent: *Feb. 20, 2001

(54) DISPLAY WITH GEAR TYPE HINGE (75) Inventor: Young Un Bang, Kyunggi-do (KR)

(73) Assignee: LG. Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/937,801

(22) Filed: Sep. 25, 1997

(30) Foreign Application Priority Data

Sep. 4, 1997 (KR) .................................................. 97-45880

(51) Int. Cl.⁷ ................................ G06F 1/16; E05D 7/00
(52) U.S. Cl. ............................ 361/681; 361/680; 16/354
(58) Field of Search .................................. 361/680, 681, 361/683; 400/682, 688, 689; 16/278, 354, 342; 364/708.1

(56) References Cited

U.S. PATENT DOCUMENTS

| | | |
|---|---|---|
| 4,781,422 | 11/1988 | Kimble . |
| 5,102,084 | 4/1992 | Park . |
| 5,121,521 * | 6/1992 | Hagiwara et al. ...................... 16/278 |
| 5,195,210 * | 3/1993 | Lee ........................................... 16/54 |
| 5,363,089 * | 11/1994 | Goldenberg ..................... 340/825.44 |
| 5,754,395 * | 5/1998 | Hsu et al. ............................. 361/680 |
| 5,818,360 * | 10/1998 | Chu et al. .............................. 341/22 |
| 5,847,685 * | 12/1998 | Otsuki .................................... 345/87 |
| 5,987,704 * | 11/1999 | Tang ..................................... 16/354 |

FOREIGN PATENT DOCUMENTS

| | | | |
|---|---|---|---|
| 2305689 | 4/1997 | (GB) | ................................ G06F/1/16 |
| 2305690 | 4/1997 | (GB) | ............................. E05D/11/08 |

* cited by examiner

Primary Examiner—Benjamin R. Fuller
Assistant Examiner—Jagdish Patel
(74) Attorney, Agent, or Firm—Long Aldridge & Norman LLP (57) ABSTRACT

A portable information processing apparatus includes a lid including a rear case containing a display unit, a body containing a keyboard, and a hinge rotatably coupling the lid to the body. The hinge includes a frame secured to the body, a torque unit, a shaft surrounded by the torque unit, the shaft being fixed to the frame, and an arm secured to the rear case of the lid and rotatably connected to the frame, the arm having an interlocking joint at one end engaging the torque unit to rotate the shaft in response to a rotation of the arm.

11 Claims, 9 Drawing Sheets

DISPLAY WITH GEAR TYPE HINGE

BACKGROUND OF THE INVENTION

1. Field of the Invention

The present invention relates to a hinge for a display apparatus, and more particularly, to a portable display having a hinge rotatably coupling a lid to a main body.

2. Description of the Related Art

A hinge used in a conventional LCD is described with reference to FIGS. 1 and 2.

Figure 1:
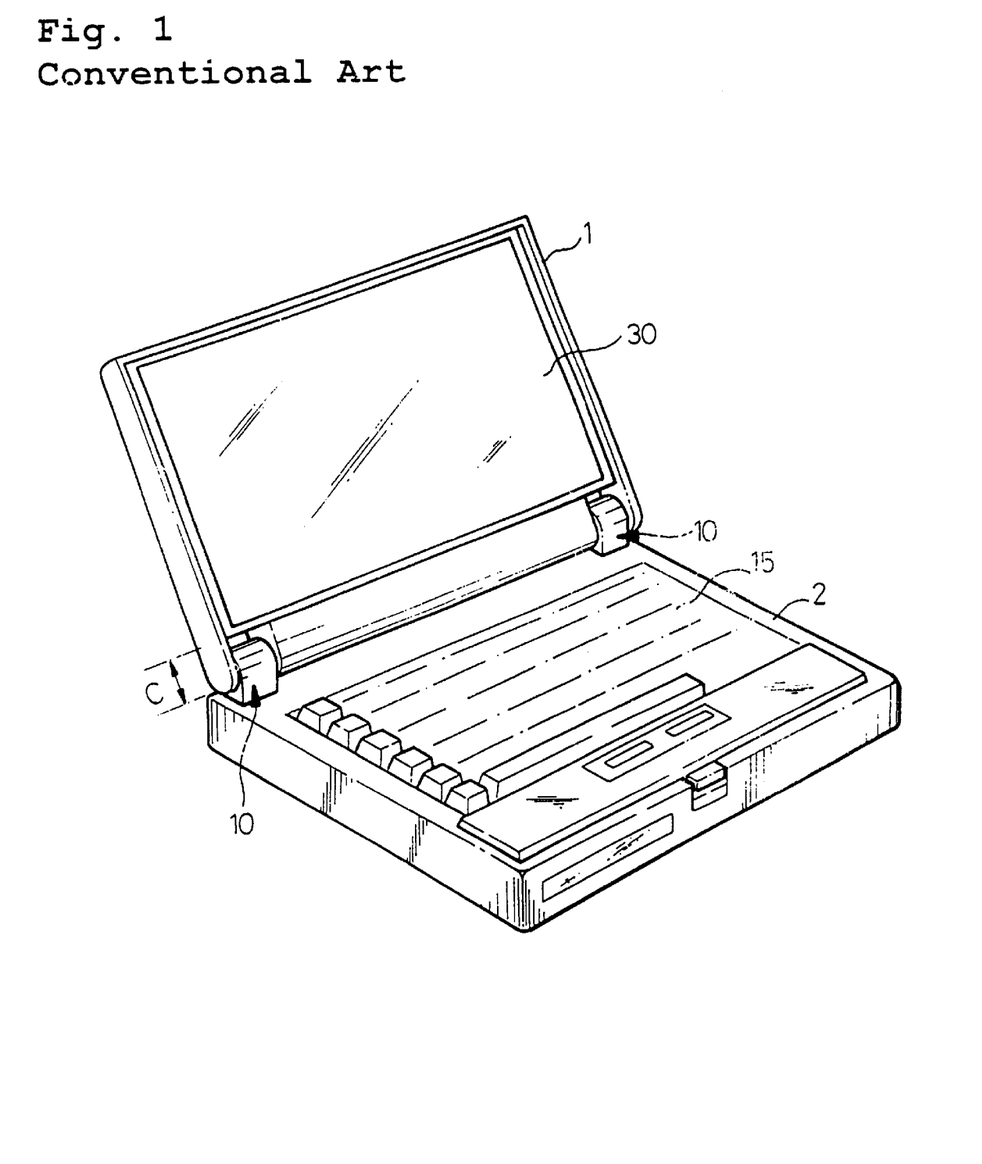
FIG. 1 is a three-dimensional view of a conventional portable information processing display.

As shown in FIG. 1, the conventional LCD includes a main body 2 and a lid having a rear case 1. A keyboard 15 for inputting data is retained in the main body. An LCD unit 30 is provided in the rear case 1 for displaying data that are input from the keyboard 15.

A hinge 10 rotatably coupling the lid with the main body is attached to the side of the main body 2 and the side of the rear case 1 of the lid.

The dimension of the hinge 10 is proportional to the size of the computer.

The weight of the lid increases in proportion to the size of the portable information processing display. Therefore, as the weight of the lid increases, so too must the size of the hinges which support the lid when it is open.

Figure 2:
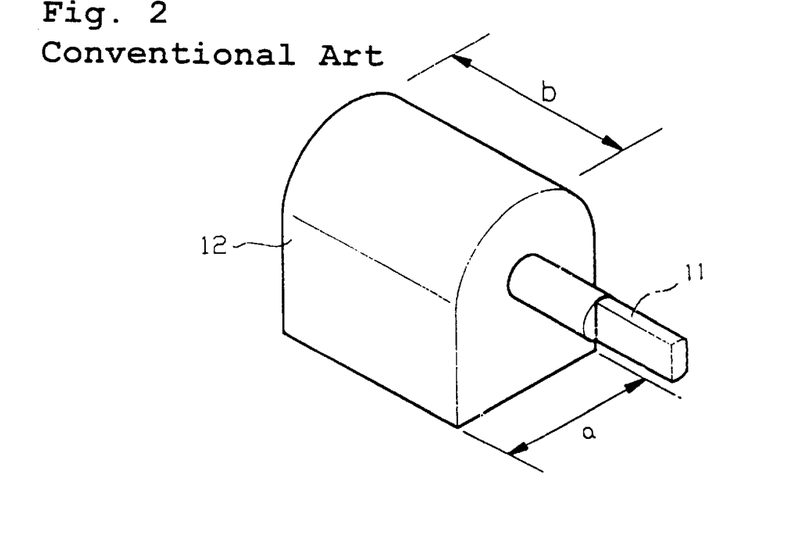
FIG. 2 is an enlarged view showing a hinge of the conventional portable information processing display in FIG. 1.

As shown in FIG. 2, the hinge-shaft 11 is fixed within a cylindrical apparatus 12 in the conventional portable information processing display. The cylindrical apparatus 12 is attached to the edge of the main body 2 and the hinge-shaft 11 is fixed to the rear case 1 of the lid. Therefore, the hinge-shaft is capable of rotating so that the lid can open and close. The torque elements should have enough supporting strength to support the lid when it is open at a desired angle. In the conventional portable information processing display having a 12-inch screen, for example, the cylindrical apparatus which houses the hinge-shaft should be more than 6 mm in width and 8 mm in length.

Because the cylindrical apparatus having the above described dimensions is located at the top edge of the main body, the maximum size of the screen is limited by the space depicted by the letter "C" in FIG. 1.

Figure 3:
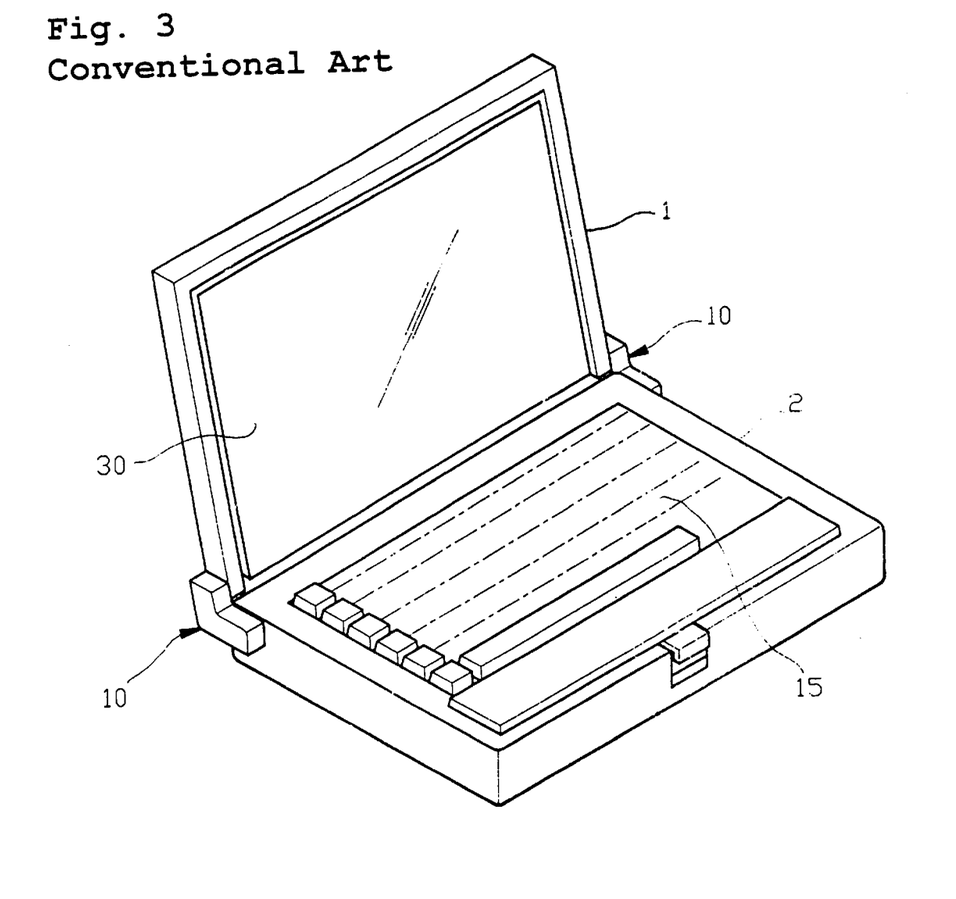
FIG. 3 is a three-dimensional view of another conventional portable information processing display.

To solve this problem, another portable information processing display has a hinge 10 attached to each side of the lid and the main body as shown in FIG. 3. This structure allows an increase in the size of the screen to some degree. However, because the cylindrical apparatus housing the hinge is located at the side of the main body and the lid, the apparatus is not flush with the main body and lid and juts out from the side. This results in an increased size of the unit, and an uneven profile that is neither ergonomic nor aesthetically pleasing.

SUMMARY OF THE INVENTION

Accordingly, the present invention is directed to a liquid crystal display device that substantially obviates one or more of the problems due to limitations and disadvantages of the related art.

An object of the present invention is to provide a gear-like hinge having a small width to the inner portion of a side of a display device lid.

Another object of the present invention is to provide a portable display with a larger screen without having to increase the size of the apparatus.

Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

To achieve these and other advantages and in accordance with the purpose of the present invention, as embodied and broadly described, a portable information processing apparatus comprises a a lid including a rear case containing a display unit; a body containing a keyboard; and a hinge rotatably coupling the lid to the body, the hinge including: a frame secured to the body; a torque unit; a shaft surrounded by the torque unit, the shaft being fixed to the frame; and an arm secured to the rear case of the lid and rotatably connected to the frame, the arm having an interlocking joint at one end engaging the torque unit to rotate the shaft in response to a rotation of the arm.

In another aspect of the present invention, a portable information processing apparatus comprises a lid including a rear case containing a display unit; a body containing a keyboard; and a hinge rotatably coupling the lid to the body, the hinge including: a frame secured to the rear case of the lid; a torque unit; a shaft surrounded by the torque unit, the shaft being fixed to the frame; and an arm secured to the body and rotatably connected to the frame, the arm having an interlocking joint at one end engaging the torque unit to rotate the shaft in response to a rotation of the arm.

It is to be understood that both the foregoing general description and the following detailed description are exemplary and explanatory only are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. The structure of the hinge used in the present invention will now be described with reference to FIG. 5.

Figure 5:
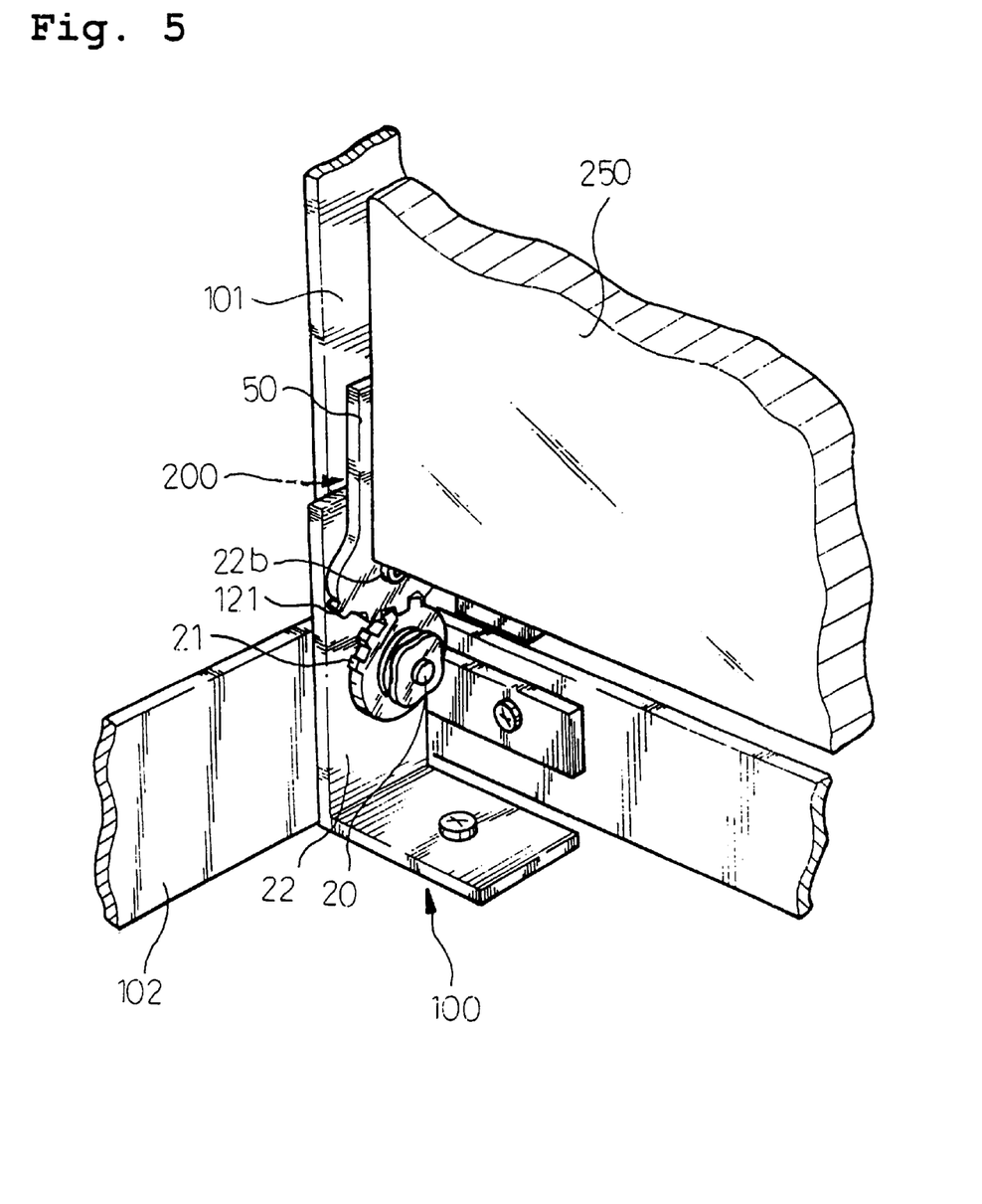
FIG. 5 is an enlarged view showing a hinge of the portable information processing display in FIG. 4.

In the portable computer of the present invention, a gear-like hinge is attached to the inner portion of the side of the lid and to the inner portion of the side of the main body. The portion of the hinge attached to the inner portion of the lid is preferably no more than 5 mm. In order to provide for a hinge with such a thickness, the hinge includes a shaft surrounded by a torque unit, including washers and a gear. The shaft is fixed to the frame of the hinge. The hinge also includes an arm rotatably fixed to the frame at a slight distance from the location at which the shaft is fixed. The arm has a gear-like shape at one end, engaging the gear. The frame is attached to the case of the main body and the arm is attached to the rear case of the lid. The frame and the arm can be made very thin. For example, both may be approximately 2 mm in width. Accordingly, only a very small space is required in the lid in order to attach the hinge to the rear case of the lid. As a result, the size of the screen can be increased.

Figure 4:
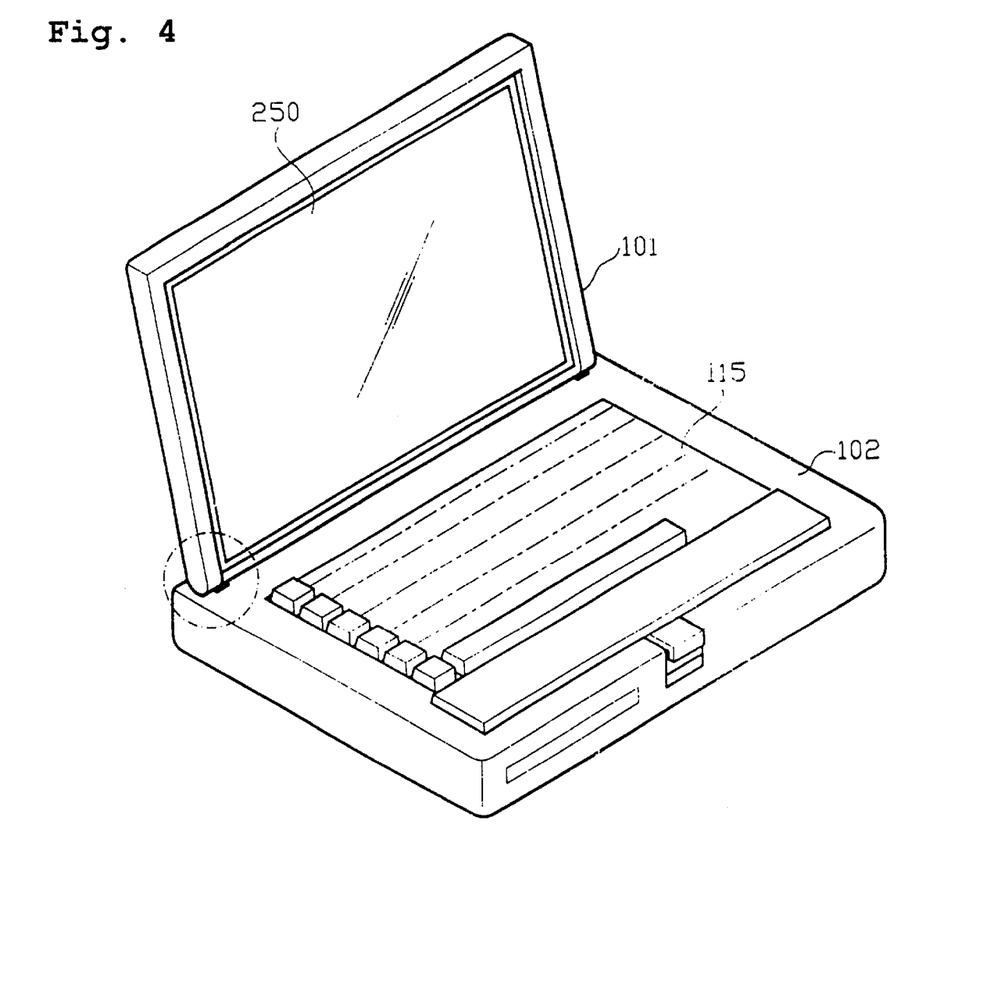
FIG. 4 is a three-dimensional view of a portable information processing display of the present invention.

FIG. 4 is a three-dimensional view of a portable information processing display which has a larger screen than the conventional portable information processing display of FIG. 1. In FIG. 4, reference number 101 is the rear case of the lid containing an LCD unit, and reference number 102 is the main body which retains a keyboard 115. FIG. 5 is an enlarged view showing a circled portion of FIG. 4.

Referring to FIGS. 4 and 5, the hinge of the present invention has a first attachment piece 100. A shaft 20 of the first attachment piece 100, which is surrounded by torque unit 23, which includes a gear 21, is fixed to a frame of the first attachment piece through a hole 22a (see FIG. 8, for example). The hinge has a second attachment piece 200, which includes an arm 50 rotatably fixed through a hole 22b. The arm has a gear-like shape 121 at one end. The gear-like shape 121 of the arm 50 engages the gear 21 of the first attachment piece 100. Therefore, both pieces are relatively rotatable. As the arm 50 of the second attachment piece 200 rotates, the gear 21 of the first attachment piece 100 rotates about the shaft 20.

The first attachment piece 100 is preferably attached to the inner portion of the side of the main body 102 and the second attachment piece 200 is preferably attached to the inner portion of the side of the rear case 101 of the lid. Alternatively, the second attachment piece 200 can be attached to the side of the LCD unit 250.

It is preferable to make the frame 22 and the arm 50 thinner. For example, the entire width of the frame and the arm which is connected to the frame should preferably be 5 mm or less.

In FIG. 5, the frame 22 of the first attachment piece 100 is attached to the main body 102 and the arm 50 of the second attachment piece 200 is attached to the rear case 101 of the lid. Alternatively, the frame 22 can be attached to the rear case 101 of the lid and the arm 50 can be attached to the main body 102.

The torque unit 23 include the gear 21 are reliable enough to support the lid when it is open at a desired angle. Moreover, even after 30 thousand test-runs, the torque unit 23 and the gear 21 remains reliable.

Figure 9:
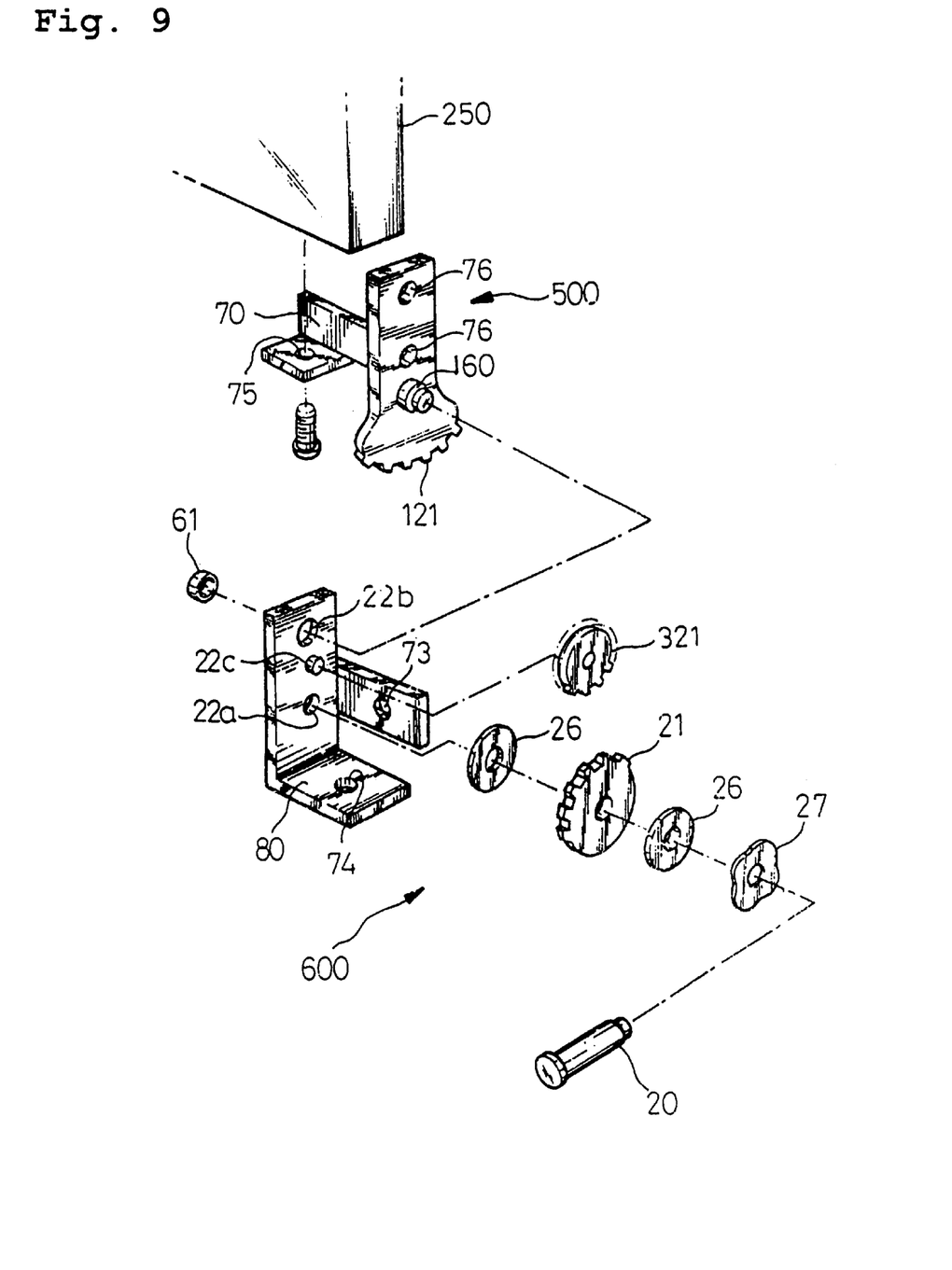
FIG. 9 shows another example of how to assemble the hinge of the present invention.

The hinge may have a second gear 321 which relays the rotation of the arm to the gear 121 as shown in FIG. 9. The second gear is attached to the frame 22.

Figure 6:
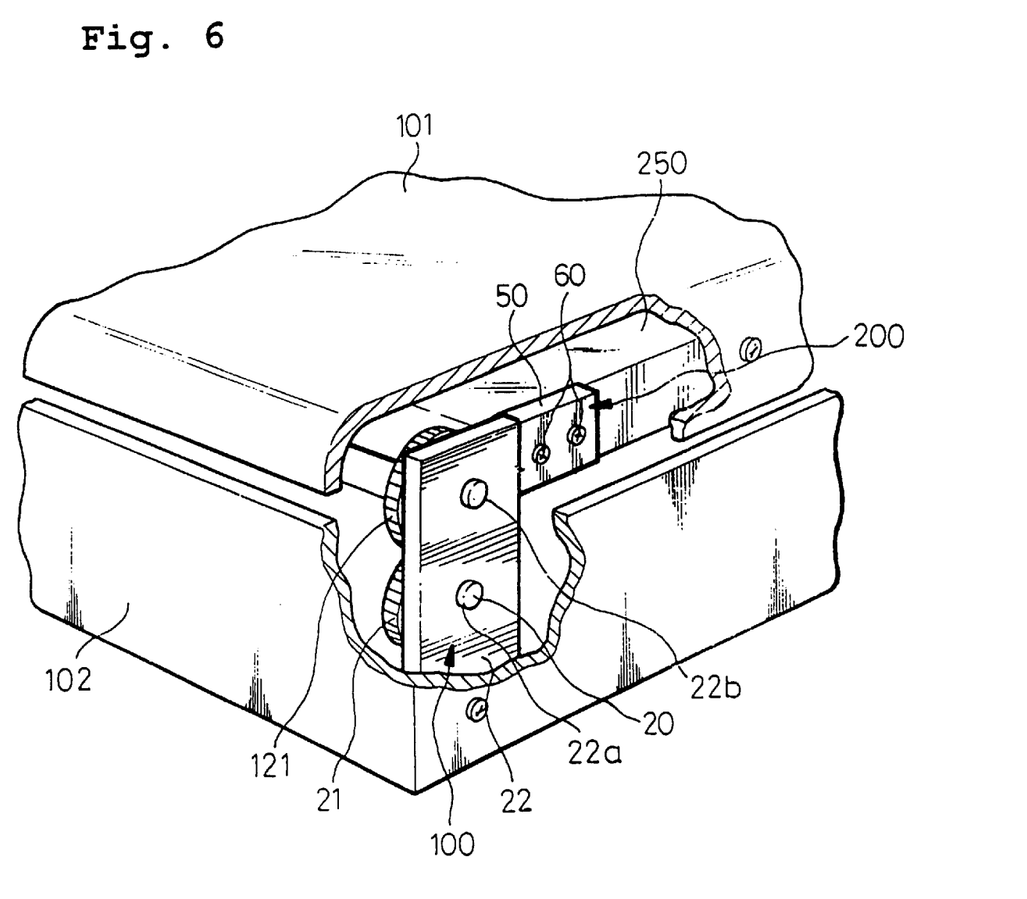
FIG. 6 is a perspective view of a hinge of the portable information processing display according to the present invention, where the rear case of the lid, the LCD unit, and the case of the main body are assembled.

FIG. 6 is a perspective view showing the hinge when the lid and the main body are assembled.

As shown in FIG. 6, the shaft 20 which is surrounded by the torque unit 23, which includes the gear 21, is fixed to the frame 22 of the first attachment 100 through a hole 22a. The arm 50 of the hinge is rotatably fixed to the frame 22 through a hole 22b at a slight distance from the location at which the shaft is fixed. The arm 50 has a gear-like shape 121 at one end, engaging the gear 21.

The first attachment piece 100 is preferably secured to the inner portion of the side of the main body 102 by a fixing element such as a screw. The arm 50 of the second attachment piece 200 is preferably secured to the side of the LCD unit 250 by a fixing element 60 such as a screw.

Because the hinge having the first and second attachment pieces is to be secured to the main body and the lid, rotation of the arm 50 is relayed to the gear 21 as the lid opens. At this time, the torque unit 23 rotates together with the gear of the torque unit 23. This allows the lid to be opened smoothly. The torque unit 23 should be designed to support the lid 101 when it is open at a desired angle such as from 0° to 180°. Namely, the torque unit 23 as well as the gear 21, should be designed so that the lid 101 remains in place when it is open unless force is applied to rotate the lid.

Figure 7A:
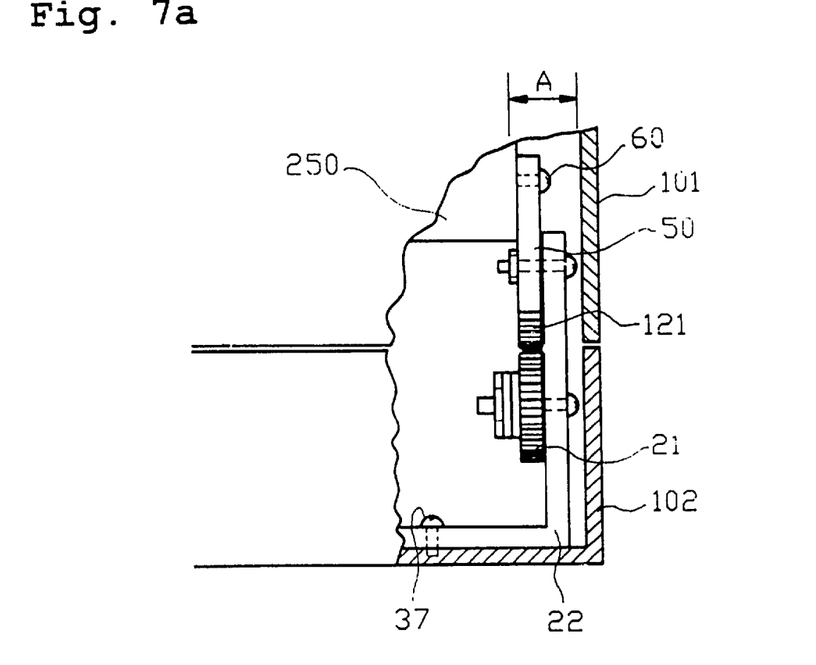
FIG. 7a is a cross-sectional view showing an embodiment of the hinge of the portable display of the present invention.
Figure 7B:
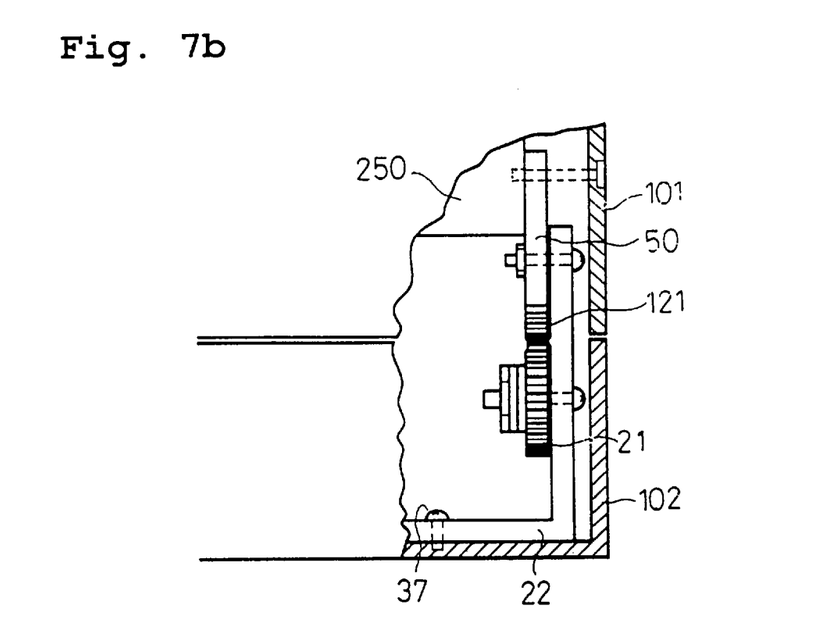
FIG. 7b is a cross-sectional view showing another embodiment of the hinge of the portable display of the present invention.

FIGS. 7a and 7b show cross-sectional views of different preferred embodiments of the hinge of the present invention.

Referring to FIG. 7a, the first attachment piece having frame 22 is attached to the side of the main body 102 by a fixing element 37 such as a vice or a screw, for example. The shaft which is surrounded by the torque unit 23, which includes washers and the gear 21 is secured to the frame 22. The arm of the second attachment piece is connected to the frame 22. The arm has a gear-like shape 121 at one end, engaging the gear 21. The second attachment piece is secured to the side of the LCD unit 250 which is contained in the rear case 101 of the lid by a supporter 70 projecting from the second attachment piece.

FIG. 7b is an alternative embodiment of the hinge of the present invention. The hinge shown in FIG. 7b is similar to FIG. 7a except that the arm 50 of the second attachment is secured together with the rear case 101 and the LCD 250.

In order to obtain more space in the lid for a larger screen, the width depicted by "A" in FIG. 7a, for example, which is the entire width of the frame and the arm, should be, for example, slightly more or less than 5 mm, the optimum width being less than 5 mm.

A more detailed description of the hinge is given below with reference to FIGS. 8 and 9.

Figure 8:
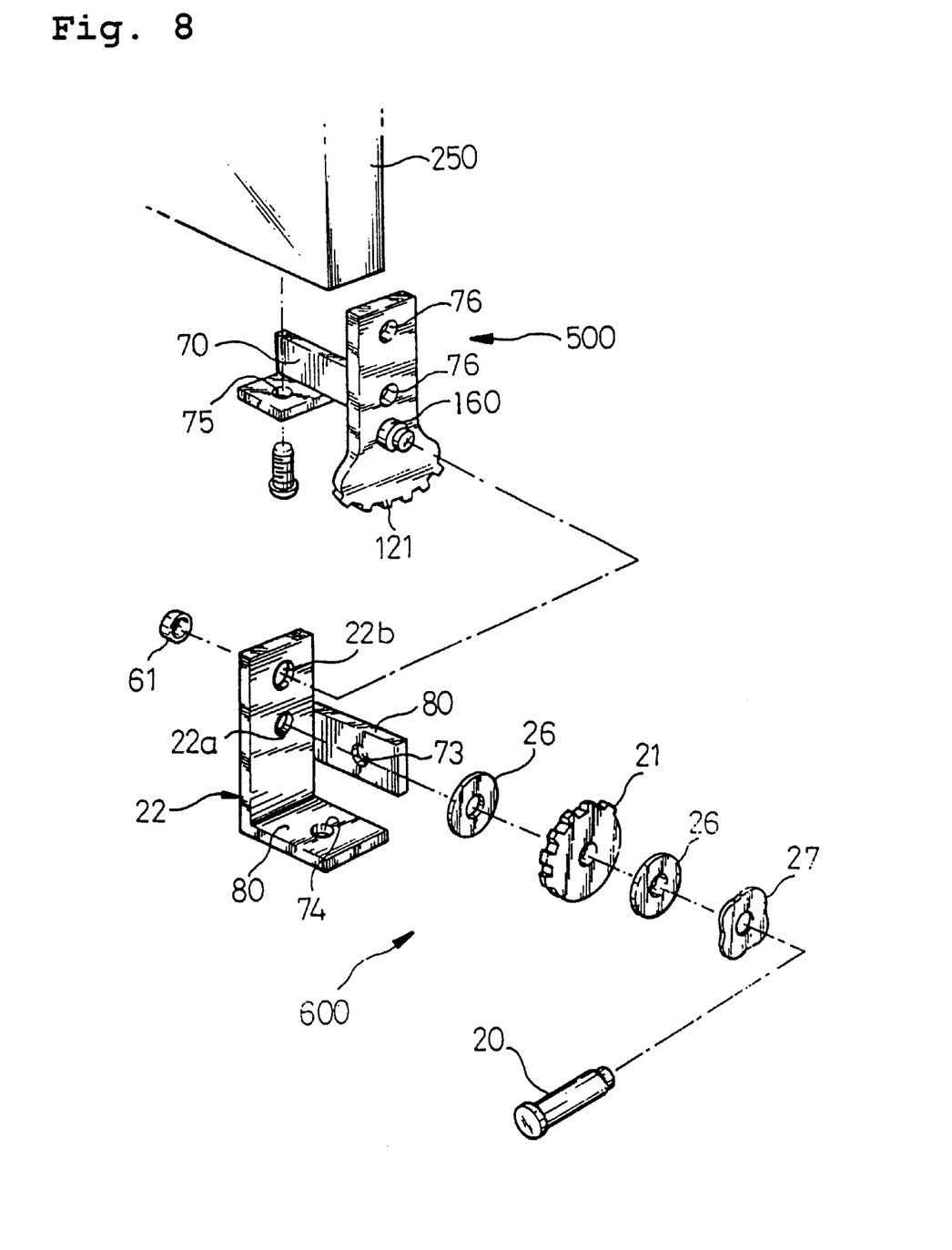
FIG. 8 shows one example of how to assemble the hinge of the present invention.

As shown in FIG. 8, the arm 50 of the second attachment piece 500 has a gear-like shape 121 at one end. A fixing element 60 is provided for securing the arm 50 to the first attachment piece 600. The fixing element 60 is secured to the hole 22b of the frame 22. The arm is rotatably fixed to the frame by the fixing element 60. A cap 61 is provided to prevent the fixing element 60 from becoming detached from the hole 22b of the frame 22.

The supporter 70 projecting from the arm 50 of the second attachment piece has a hole 75. The second attachment piece is secured to the rear case of the lid or the LCD unit by placing a vice or a screw into the hole 75.

The second attachment piece 500 is also secured to the rear case of the lid or the LCD unit 250 through a hole 76 which is located at the arm 50 by means of a vice or a screw, for example.

The frame of the first attachment piece 600 has the hole 22a in which the shaft 20 surrounded by the torque unit 23 is secured. The torque unit 23 includes the gear 21, bearing washers 26 and a spring washer 27. The gear 21 engages the gear-like shape 121 of the arm 50.

A supporter 80 projecting from the frame 22 has holes 73 and 74 through which a vice or a screw, for example, is placed. As a result, the first attachment piece is fixed to the main body.

The hinge shown in FIG. 9 is similar to the hinge shown in FIG. 8 and has a second gear 321 which relays the rotation of the arm to the gear 21. The second gear 321 is pivotally secured to a hole 22c between the holes 22a and 22b.

Figure 10:
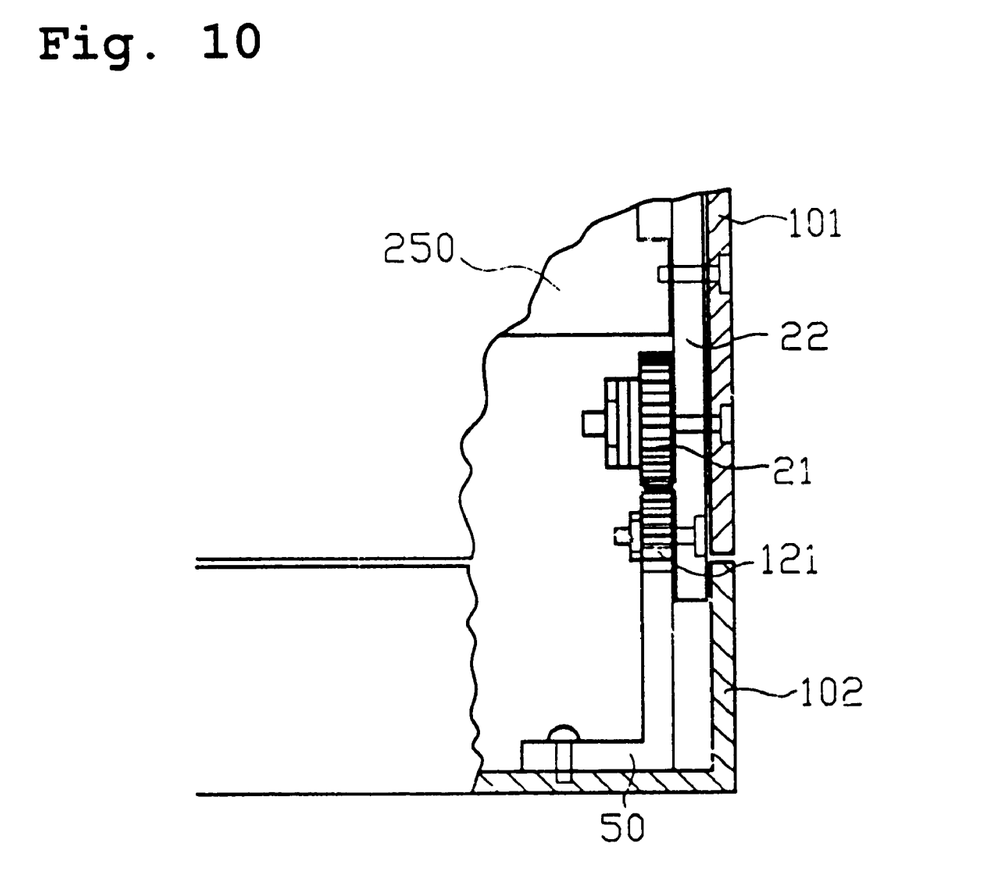
FIG. 10 is a cross-sectional view showing another embodiment of the hinge of the portable display of the present invention.

FIG. 10 is a cross-sectional view of another embodiment of the hinge of the present invention. In particular, unlike the hinge embodiments shown in FIGS. 7a and 7b, the hinge shown in FIG. 10 has the arm 50 of the second attachment piece attached to the main body 102 and the frame 22 attached to the rear case 101 of the lid. Thus, the arm 50 and the frame 22 are attached to the main body 102 and rear case 101 in reverse of the embodiments in FIGS. 7a and 7b, respectively.

Accordingly, a portable information processing display of the present invention has a main body and a lid. The lid has an LCD unit having a size larger than that of the conventional apparatus without increasing the size of the apparatus by attaching a gear type hinge to the inner portion of the side of the rear case of the lid. The hinge has a first attachment piece 100, the frame of which has a hole 22a through which a shaft 20 is fixed. The torque unit 23 which includes a spring washer, two bearing washers, and a gear 21, surrounds the shaft 20. The hinge has a second attachment piece 200, having an arm 50 fixed to a hole 22b. The arm 50 has a gear-like shape 121 at one end. The gear-like shape 121 of the arm 50 engages the gear 21 of the first attachment piece 100. Therefore, both pieces are relatively rotatable. As the arm 50 of the second attachment piece 200 rotates, the gear 21 of the first attachment piece 100 rotates on the shaft 20. The first attachment piece 100 is fixed to an inner portion of the side of the main body 102 which contains a keyboard. The second attachment piece 200 is fixed to an inner portion of the side of the rear case 101 of the lid. Alternatively, the second attachment piece 200 is fixed to the side of the LCD 250.

The portable computer of the present invention has a hinge, which couples the lid and the main body, the width of which is preferably 5 mm or less. The present invention allows the portable computer to have a larger screen without increasing the size of the computer. For example, according to the present invention, a display of the LCD unit of 13-inches or more can be contained in a case which is normally used for a 12-inch display of the LCD unit.

Although the weight of the lid is increased in proportion to the display size, the gear-like hinge of the present invention is made strong enough to support the lid at a desired angle when it is open.

Accordingly, the portable information processing display of the present invention has an LCD screen size that is enlarged without increasing the size of the apparatus by using a gear-like hinge.

It will be apparent to those skilled in the art that various modifications and variations can be made in the display with gear type hinge of the present invention without departing from the spirit or scope of the invention. Thus, it is intended that the present invention cover the modifications and variations of this invention provided they come within the scope of the appended claims and their equivalents.

What is claimed is:

1. A portable information processing apparatus comprising:
   a lid including a rear case containing a display unit;
   a body containing a keyboard; and
   a hinge rotatably coupling the lid to the body, the hinge including:
      a frame secured to the body;
      a torque unit having a gear, the torque unit resisting rotation of the lid and thereby facilitating maintaining relative angular positions between the lid and the body;
      a shaft surrounded by the torque unit, the shaft being fixed to the frame; and
      an arm secured to the rear case of the lid and rotatably connected to the frame, the arm having one end connected to the rear case and another end having an interlocking joint engaging the gear of the torque unit to rotate the lid in response to a rotation of the gear, the arm being positioned between the rear case and the display unit.

2. The apparatus according to claim 1, wherein the arm is connected to the rear case at a position adjacent to the torque unit.

3. The apparatus according to claim 1 wherein the interlocking joint of the arm includes a gear shape.

4. The apparatus according to claim 3, wherein the gear of the torque unit engages the gear shape of the arm.

5. The apparatus according to claim 3, further comprising another gear coupled to the frame, the another gear disposed between the gear of the torque unit and the gear shape of the arm.

6. The apparatus according to claim 1, wherein the frame and the arm each have a width grater than 0 mm and less than 5 mm.

7. The apparatus according to claim 1, wherein the frame is secured to an inner portion of the body and the arm is secured to an inner portion of the lid.

8. The apparatus according to claim 7, wherein the frame and the arm each have a width greater than 0 mm and less than 5 mm.

9. The apparatus according to claim 1, further comprising another gear disposed between the gear of the torque unit and the interlocking joint of the arm, said another gear transferring a rotation of the gear of the torque unit to the interlocking joint.

10. The apparatus according to claim 1, wherein the arm is secured to a side of the display unit.

11. The apparatus according to claim 1, wherein the torque unit further comprises a washer.

* * * * *